(12) United States Patent
Watanabe et al.

(10) Patent No.: US 7,778,504 B2
(45) Date of Patent: Aug. 17, 2010

(54) OPTICAL WAVEGUIDE DEVICE AND MANUFACTURING METHOD THEREOF

(75) Inventors: Shinya Watanabe, Tokyo (JP); Naoki Sakuma, Yamanashi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/348,205

(22) Filed: Jan. 2, 2009

(65) Prior Publication Data

US 2009/0116803 A1   May 7, 2009

Related U.S. Application Data

(63) Continuation of application No. 11/733,044, filed on Apr. 9, 2007, now Pat. No. 7,492,984.

(30) Foreign Application Priority Data

Apr. 17, 2006   (JP) .............................. 2006-113349

(51) Int. Cl.
    *G02B 6/10*   (2006.01)
(52) U.S. Cl. ......................... 385/14; 385/129
(58) Field of Classification Search .................. None
    See application file for complete search history.

(56) References Cited

U.S. PATENT DOCUMENTS

| 5,488,678 | A  | * | 1/1996  | Taneya et al. ................. 385/14 |
| 5,907,646 | A  |   | 5/1999  | Kitamura |
| 6,324,314 | B1 | * | 11/2001 | Ukechi et al. ................. 385/14 |
| 6,804,444 | B2 |   | 10/2004 | Shin et al. |
| 2003/0205794 | A1 | * | 11/2003 | Lee et al. ..................... 257/678 |
| 2004/0028312 | A1 | * | 2/2004  | Park et al. ..................... 385/14 |
| 2007/0253670 | A1 |   | 11/2007 | Watanabe |

FOREIGN PATENT DOCUMENTS

JP            2823044 B2    9/1998

\* cited by examiner

*Primary Examiner*—Mike Stahl
(74) *Attorney, Agent, or Firm*—Sughrue Mion, PLLC

(57) ABSTRACT

An optical waveguide device which includes an optical waveguide part and a photonic device mounting part is provided. A mask to form a pedestal block on which a light emitting device is mounted is patterned after high-temperature annealing. Thus, there is no influence on the mask, even if the device undergoes the heat treatment at a high temperature during the manufacturing process. This enables formation of the pedestal block with high accuracy. Therefore, it is possible to achieve an optical coupling with high accuracy in mounting a light emitting device on the pedestal block.

10 Claims, 4 Drawing Sheets

OPTICAL WAVEGUIDE DEVICE AND MANUFACTURING METHOD THEREOF

CROSS-REFERENCE TO RELATED APPLICATION

This application is based upon and claims priority from U.S. application Ser. No. 11/733,044, filed Apr. 9, 2007, and Japanese Patent Application No. 2006-113349, filed on Apr. 17, 2006, in the Japanese Patent Office, the disclosure of which is hereby incorporated by reference in its entirety.

BACKGROUND OF THE INVENTION

1. Field of the Invention

Apparatuses and manufacturing methods consistent with the present invention relate to an optical waveguide device which includes an optical waveguide part and an optical device mounting part on a substrate.

2. Description of the Related Art

Optical transceivers used in optical access markets are broadly divided into a microoptics type module composed of an laser diode (LD), a photo detector (PD), a thin film filter, and a lens, and a planar lightwave circuit (PLC) type module configured by making a silica waveguide on a silicon substrate and surface-mounting an LD and a PD. While both of them have advantages and disadvantages, the latter is more advantageous in terms of cost and delivery because it does not require optical axis adjustment. This mounting method which does not require optical axis adjustment is generally called a "passive alignment mounting".

In passive alignment mounting, a planar position of an optical component against an optical waveguide chip is determined by performing image detection and recognition of alignment markers provided to both of them with infrared transmitted light. A vertical position of the optical component is determined by the height of a block called a pedestal. Because the pedestal height can be made with high accuracy, it is possible to match the height with an optical waveguide with high accuracy by mounting the optical component on the pedestal.

This kind of optical waveguide device is disclosed in Japanese Patent Number 2,823,044. FIG. 3 is an exploded perspective view showing a related art optical waveguide device disclosed in this patent. In FIG. 3, an optical waveguide device 50 includes an optical waveguide part 56, which consists of an optical waveguide forming layer 55 with lower cladding layers 521 and 522, a core layer 53, and an upper cladding layer 54 formed on a silicon substrate 51. The optical waveguide device 50 also includes a photonic device mounting part 57, which is configured by eliminating a part of the optical waveguide forming layer 55. A light emitting device 58 mounted on the photonic device mounting part 57 is optically connected to an end face of the optical waveguide part 56, which is exposed by the elimination of a part of the optical waveguide forming layer 55.

The photonic device mounting part 57 includes a pedestal block 59, an alignment marker 60 consisting of a lower cladding layer 521, a pedestal block forming mask 62 consisting of a chromium (Cr) film 61 provided on the pedestal block 59, and the light emitting device 58 which contacts the mask 62. The lower cladding layers 521 and 522, the core layer 53, and the upper cladding layer 54 are atmospheric chemical vapor deposition (CVD) films.

In other words, the optical waveguide device 50 is a formed by surface-mounting the light emitting device 58 on a PLC chip with an optical waveguide circuit.

FIG. 4 shows sectional views of a method of manufacturing the optical waveguide device of FIG. 3, where the operations proceed in order of FIG. 4(a) to (h). Hereinafter, an explanation will be given based on FIG. 3 and FIG. 4.

In FIG. 4(a), the lower cladding layer 521 is deposited as a first layer on the silicon substrate 51.

In FIG. 4(b), the chromium film 61, which later becomes a mask for forming the pedestal block, is patterned on the lower cladding layer 521. Here, the chromium film 61, which becomes a mask for forming the alignment marker required for mounting the light emitting device 58, is patterned.

In FIG. 4(c), the lower cladding layer 522 is deposited as a second layer.

In FIG. 4(d), the core layer 53, which becomes a core of the optical waveguide part 56, is deposited on the lower cladding layer 522, and the waveguide is patterned by dry etching.

In FIG. 4(e), an upper cladding layer 541 is deposited as the first layer for embedding the core layer 53 and reflow-processed at a high temperature. The upper cladding layer 541 consists of a low melting film. The temperature of the reflow process is generally between 800° C. to 900° C.

In FIG. 4(f), an upper cladding layer 542 is deposited as the second layer to complete a waveguide structure.

In FIG. 4(g), a chromium film 63 and a photoresist film 64 are deposited, and are patterned so that only the chromium film 63 remains on the optical waveguide forming layer 55 as the optical waveguide part 56. Lastly, the end face of the core layer 53 is exposed by dry etching by using the chromium film 63 as an etching mask. Also, the pedestal block 59 and alignment marker 60 are formed by using the patterned chromium film 61 as an etching-stop mask 62 to complete the optical waveguide device.

Thereafter, elimination of the chromium film, and film formation and patterning of an insulating film and an electrode metal are performed as required. For instance, the chromium film 63 is eliminated in FIG. 4(h).

In the optical waveguide device 50, the height of the core layer 53 of the optical waveguide part 56 and the pedestal block 59 is only controlled by the accuracy of a film formation apparatus. The accuracy of the film formation apparatus is around 1%, due to variations in a wafer surface. Therefore, when the film thickness of the lower cladding layer 522 is 1.5 µm, a gap in height between the core layer 53 and the pedestal block 59 is only 15 nm. Thus, it is possible to perform optical coupling with high accuracy without performing optical axis adjustment, by adjusting a horizontal direction with the alignment marker 60, and mounting the light emitting device 58 on the pedestal block 59. More specifically, an active layer 581 of the light emitting device 58 and the core layer 53 become opposed with high accuracy. Incidentally, in FIG. 4, a heat treatment temperature of each individual operation is indicated.

The film made by the plasma CVD can have a high refractive index, and so it is possible to increase a refractive index difference between a core and a cladding, to significantly improve the flexibility in design. However, a thin film formed by the plasma CVD requires a heat treatment at a high temperature, normally around 1,100° C.

In the optical waveguide device 50, the core layer 53 is the atmospheric CVD film as previously described. This is because, if the core layer 53 is a plasma CVD film, the chromium film 61 is oxidized by the heat treatment at a high temperature, and the pedestal block forming mask 62 no longer functions correctly.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an optical waveguide device which is capable of making a pedestal block with high accuracy, even when a heat treatment at a high temperature is required, and the manufacturing method thereof.

According to an aspect of the present invention, there is provided an optical waveguide device, which comprises an optical waveguide part and a photonic device mounting part. The optical waveguide part comprises an optical waveguide forming layer having a lower cladding layer, a core layer, and an upper cladding layer formed on a substrate. The photonic device mounting part is configured by eliminating a part of the optical waveguide forming layer. The photonic device mounted on the photonic device mounting part is optically connected to an end face of the optical waveguide part, which is exposed by the elimination of a part of the optical waveguide forming layer. And the upper cladding layer comprising one layer or two or more layers. In the photonic device mounting part, the core layer and the lower cladding layer are eliminated. The photonic device mounting part comprises a pedestal block comprising at least one layer of the upper cladding layer provided on the substrate, and a mask consisting of a thin film provided on the pedestal block. The photonic device contacts the mask.

The mask of the present invention is not an etching-stop mask to prevent etching below the upper cladding layer when etching the upper cladding. The mask of the present invention may form a part the pedestal block. The thin film which becomes the mask is provided on at least one layer constituting the upper cladding layer. Therefore, there is no influence on the thin film, even if the lower cladding layer and core layer undergo a heat treatment at a high temperature before forming the thin film. Therefore, it is possible to make the pedestal block with high accuracy even when a heat treatment at a high temperature is required. Here, the material (such as a silicon dioxide film ($SiO_2$)) and height of the pedestal block are the same as those of at least one layer constituting the upper cladding layer.

The lower cladding layer and the core layer may consist of a plasma CVD film. The plasma CVD film may be annealed after the film is formed at 1,000° C. or higher, and preferably 1,100° C. or higher. In this case, the refractive index of the core layer can be increased. Thus, it is possible to increase a refractive index difference between the core layer and the cladding layer, and significantly improve the flexibility in designing an optical waveguide.

There is no limitation on the layers configuring the upper cladding layer. For example, it may consist of deposited first and second layers. In this case, the photonic device mounting part has a pedestal block consisting of the second layer and a mask consisting of a thin film provided on the pedestal block. And the lower cladding layer, the core layer and the first layer are eliminated. Thus, it is possible to form the upper cladding layer which contacts the core layer separately from the upper cladding layer for providing the mask thereon.

According to another aspect of the present invention, a method of manufacturing an optical waveguide device with an optical waveguide part and a photonic device mounting part is provided. The optical waveguide part comprises an optical waveguide forming layer having a lower cladding layer, a core layer, and an upper cladding layer formed on a substrate. The photonic device mounting part is formed by eliminating a part of the optical waveguide forming layer. The photonic device which is mounted on the photonic device mounting part is optically connected to an end face of the optical waveguide part, which is exposed by the elimination of a part of the optical waveguide forming layer. The method comprises the following operations.

In the first operation, at least the lower cladding layer and the core layer are formed on the substrate. In the second operation, at least the lower cladding layer and the core layer are eliminated in a part to become the photonic device mounting part. In the third operation, at least one layer of the upper cladding layer is formed on a part to become the optical waveguide part and on a part to become the photonic device mounting part. Thus, a pedestal block layer consisting of at least one layer of the upper cladding layer is formed on the part to become the photonic device mounting part. In the fourth operation, a mask consisting of a thin film is formed on the pedestal block layer in the part to become the photonic device mounting part. And in the fifth operation, a pedestal block is formed by eliminating the pedestal block layer other than under the mask by using the mask in the part to become the photonic device mounting part.

The lower cladding layer and the core layer may be formed by a plasma CVD in the first operation. The method may also include a operation of annealing the lower cladding layer and the core layer at 1,000° C. or higher, and preferably 1,100° C. or higher before the third operation.

Furthermore, the upper cladding layer may consist of deposited first and second layers. In this case, in the first operation, the lower cladding layer and the core layer are deposited on the substrate by the plasma CVD, and the core is formed by dry etching, and then, the lower cladding layer and the core layer are annealed at 1,000° C. or over. And next, the first layer is formed on the core layer. In this case, the annealing may be performed after the film formation of the core layer which is after the film formation of the lower cladding layer. In the second operation, the lower cladding layer, the core layer and the first layer are eliminated in the part to become the photonic device mounting part. And in the third operation, the second layer is formed on the part to become the optical waveguide part and on the part to become the photonic device mounting part. And a pedestal block layer consisting of the second layer is thereby formed on the part to become the photonic device mounting part.

At least one of the upper cladding layers may consist of an atmospheric CVD film. Because there is no need to increase the refractive index of a cladding, it is possible to use atmospheric CVD film, for which the heat treatment temperature is relatively low, to avoid generation of wasteful thermal stress. Furthermore, this should preferably be a quartz film, such as a Boro-phospho silicate glass (BPSG) film with a low melting point and a dopant, such as boron or phosphorous. Using the BPSG film reduces the thermal stress and facilitates embedding of the core. It also improves flatness and thereby enables the pedestal block to be made with high accuracy.

Furthermore, in the second operation, it is also possible to eliminate the lower cladding layer part of the way by reactive ion etching (RIE) and then eliminate the rest of the lower cladding layer by wet etching to the substrate. In this case, it is possible to obtain a substantially vertical surface including the end face of the core layer by RIE. And if, for example, the lower cladding layer is the silicon dioxide film and the substrate is silicon, it is possible to eliminate only the lower cladding layer easily without etching the substrate, because the silicon substrate can not be etched by wet etching with a hydrofluoric acid mixture such as a buffered hydrofluoric acid. Thus, the height of the pedestal block can be accurately formed.

In other words, according to exemplary embodiments of the present invention, it is possible to make an optical waveguide device having a structure for matching height of a waveguide with the height of another optical device with high accuracy even when a high-temperature treatment is necessary. And it is possible to make the pedestal block with high accuracy, even after a necessary high-temperature treatment, by making the pedestal block with a low-melting silica film with a dopant such as boron or phosphorous, and utilizing the flatness due to its reflow characteristic.

According to exemplary embodiments of the present invention, the upper cladding layer film doubles as the film to form the pedestal block. And the thin film which becomes the mask for forming the pedestal block is provided on the upper cladding layer. Therefore, there is no influence on the thin film, even if the lower cladding layer and core layer undergo a heat treatment at a high temperature before forming the thin film. Therefore, it is possible to make the pedestal block with high accuracy even when a heat treatment at a high temperature is required.

BRIEF DESCRIPTION OF THE DRAWINGS

The above and other aspects of the present invention will become more apparent by describing in detail exemplary embodiments thereof with reference to the accompanying drawings, in which.

DETAILED DESCRIPTION OF EXEMPLARY EMBODIMENTS OF THE PRESENT INVENTION

Exemplary embodiments of the invention will now be described below by reference to the attached Figures. The described exemplary embodiments are intended to assist the understanding of the invention, and are not intended to limit the scope of the invention in any way.

Figure 1:
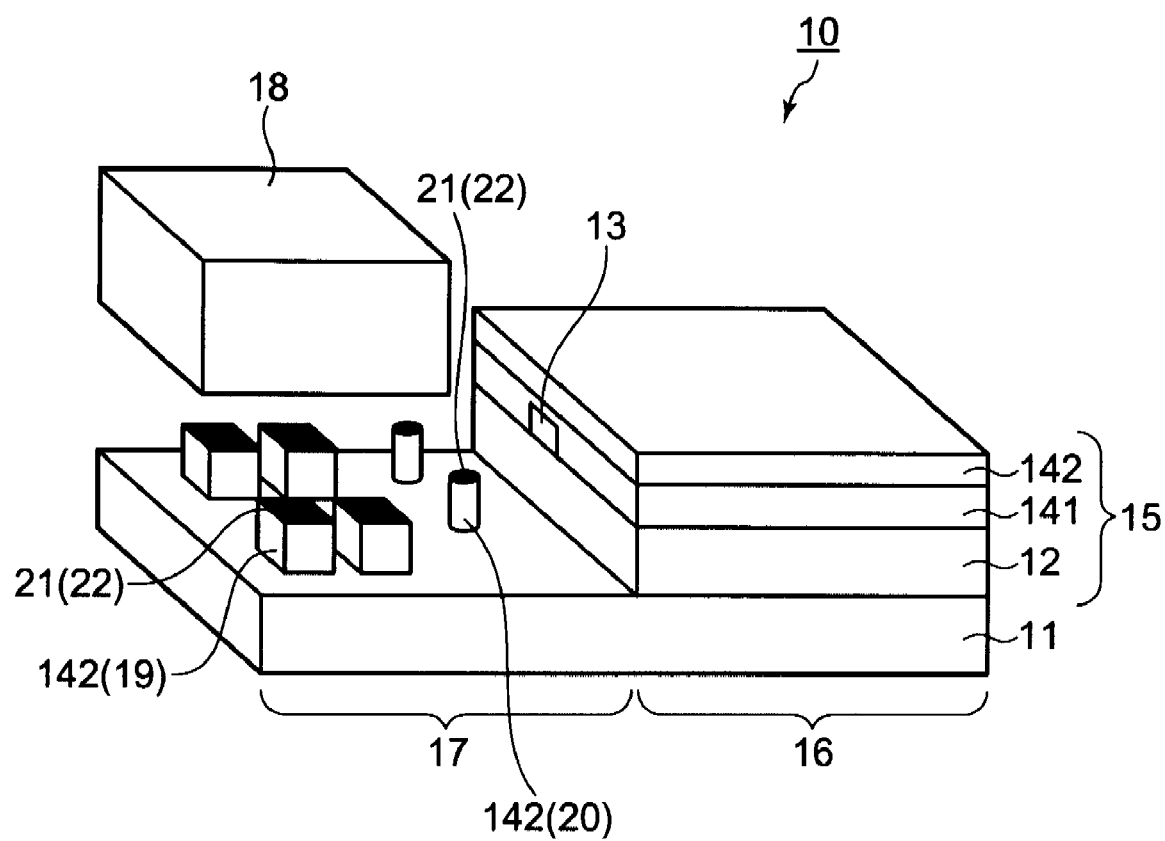
FIG. 1 is an exploded perspective view showing an exemplary embodiment of the present invention.

FIG. 1 is an exploded perspective view showing an optical waveguide device according to an exemplary embodiment of the present invention.

FIG. 1 shows that an optical waveguide device 10 comprises an optical waveguide part 16, which includes an optical waveguide forming layer 15 with lower cladding layer 12, a core layer 13, and an upper cladding layers 141 and 142 formed on a silicon substrate 11. The optical waveguide device 10 also includes a photonic device mounting part 17 formed by eliminating a part of the optical waveguide forming layer 15. A light emitting device 18, which is mounted on the photonic device mounting part 17, is optically connected to an end face of the optical waveguide part 16, which is exposed by the elimination of a part of the optical waveguide forming layer 15.

The photonic device mounting part 17 includes a pedestal block 19, an alignment marker 20, and a mask 22. The pedestal block 19 and the alignment marker 20 consist of the upper cladding layer 142. The mask 22 comprises a chromium film 21 provided on the upper cladding layer 142. The light emitting device 18 contacts the mask 22. The photonic device mounting part 17 has a part where the upper cladding layer without the mask 22 thereon is eliminated and the surface of the silicon substrate 11 is exposed.

The chromium film 21 which becomes the mask 22 is provided on the upper cladding layer 142. Therefore, there is no influence on the chromium film 21, even if the lower cladding layer 12 and core layer 13 undergo a heat treatment at a high temperature before forming the chromium film 21. Therefore, it is possible to make the pedestal block 19 with high accuracy even when a heat treatment at a high temperature is required.

The lower cladding layers 12 and the core layer 13 consist of a plasma CVD film. The plasma CVD film is annealed at 1,000° C. or higher after the film formation. By using this film, it is possible to increase a refractive index difference between the core layer 13 and the lower cladding layer 12. Therefore, flexibility in designing an optical waveguide is significantly improved.

FIG. 2 shows a method of manufacturing the optical waveguide device of FIG. 1, where the operations proceed in order of FIG. 2(a) to (h). Hereinafter, an explanation according to an exemplary embodiment of the present invention will be given based on FIG. 1 and FIG. 2.

Figure 2A:
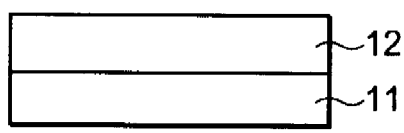
FIG. 2 is a sectional view showing a method of manufacturing the optical waveguide device according to an exemplary embodiment of the present invention.

In FIG. 2(a), the lower cladding layer 12 is formed on the silicon substrate 11 by a plasma CVD. If necessary, a high-temperature annealing process at about 1,100° C. can be performed after the formation of the layer.

Figure 2B:
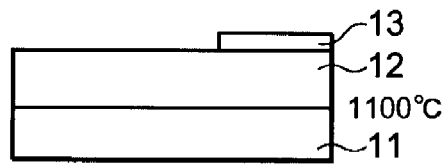

In FIG. 2(b), a SiON film, which becomes the core layer 13, is deposited on the lower cladding layer 12 by the plasma CVD, and the waveguide is patterned on the core layer 13 by dry etching. Thereafter, the high-temperature annealing process at about 1,100° C. may be performed. The high-temperature annealing process may be performed before patterning the waveguide if the thermal stress is not problematic.

Figure 2C:
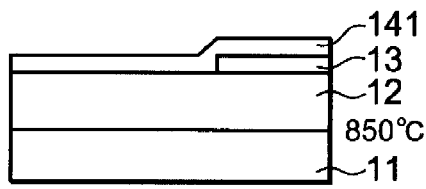

In FIG. 2(c), an upper cladding layer 141 is deposited for embedding the core layer 13. The upper cladding layer 141 is then reflow-processed at about 850° C. to embed the core layer 13. The upper cladding layer 141 may be a low melting film, such as BPSG film deposited by an atmospheric pressure CVD.

Figure 2D:
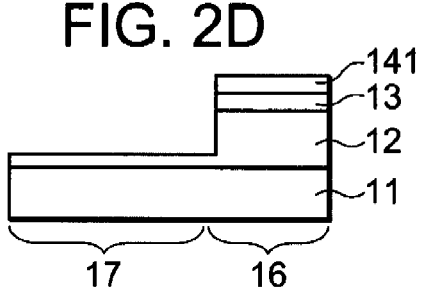

In FIG. 2(d), the lower cladding layer 12, the core layer 13 and the upper cladding layer 141 of the part for mounting the light emitting device 18 (that is, the photonic device mounting part 17) are etched part of the way through the lower cladding layer 12 by RIE.

Figure 2E:
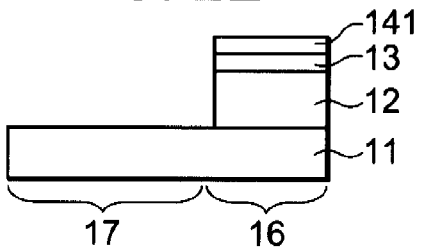

In FIG. 2(e), the lower cladding layer 12 is etched by wet etching with a buffered hydrofluoric acid until the silicon substrate 11 becomes exposed. The reason for using the wet etching with the buffered hydrofluoric acid is to prevent the silicon substrate from being etched. While the RIE etches a small amount of the silicon, the buffered hydrofluoric acid does not etch the silicon. Therefore, it is possible to eliminate only the lower cladding layer 12 without eliminating the silicon substrate 11. Then, it is possible to form the pedestal block 19 with a highly accurate height.

Figure 2F:
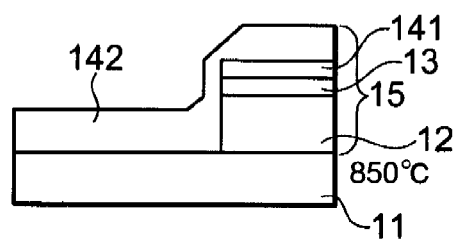

In FIG. 2(f), an upper cladding layer 142 is deposited by an atmospheric pressure CVD. The upper cladding layer 142 is then reflow-processed at about 850° C. to improve the flatness of its surface. The upper cladding layer 142 may be a low melting film, such as BPSG film.

Figure 2G:
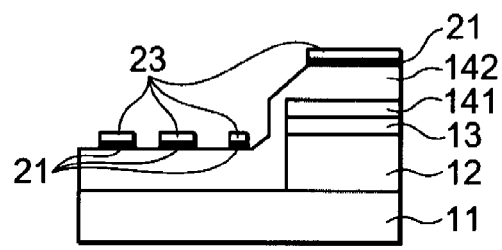

In FIG. 2(g), the chromium film 21 and a photoresist film 23 are deposited on the upper cladding layer 142. Then, the mask 22 for forming the pedestal block 19 is patterned. In this case, the chromium film 21 which becomes the mask for forming the alignment marker required when mounting the light emitting device 18 is patterned at the same time. In addition, the chromium film 21 which becomes the mask for forming the end face of the core layer 13 is also patterned at the same time.

Figure 2H:
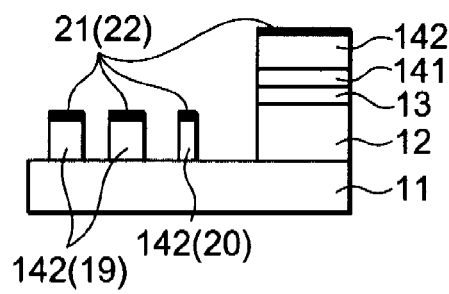
Figure 2I:
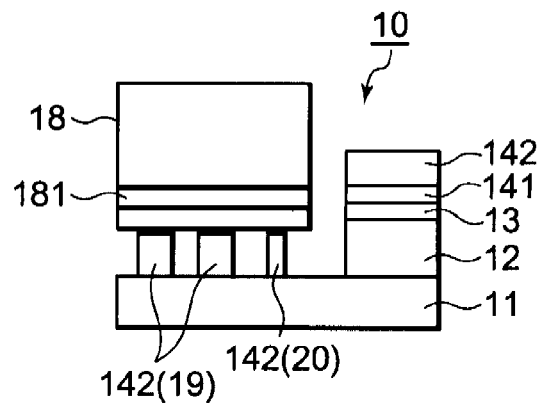
Figure 3:
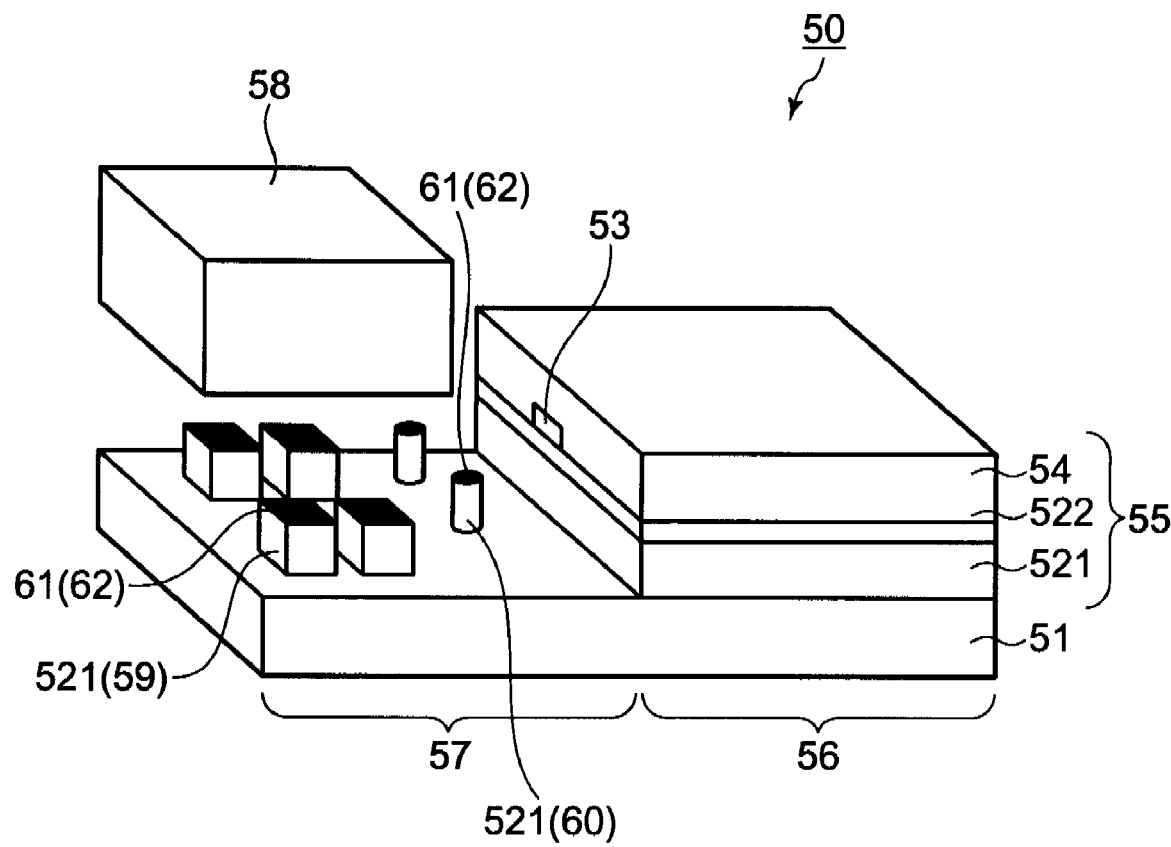
FIG. 3 is an exploded perspective view showing a related art optical waveguide device.
Figure 4A:
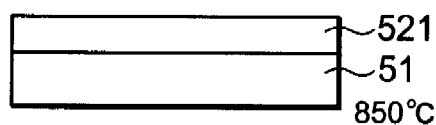
FIG. 4 is a sectional view showing the method of manufacturing the related art optical waveguide device of FIG. 3.
Figure 4B:
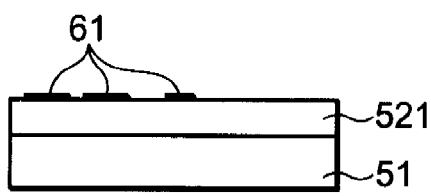
Figure 4C:
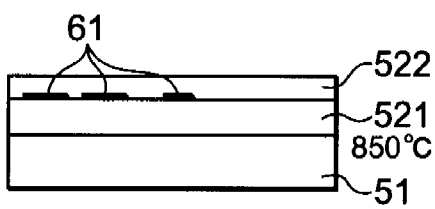
Figure 4D:
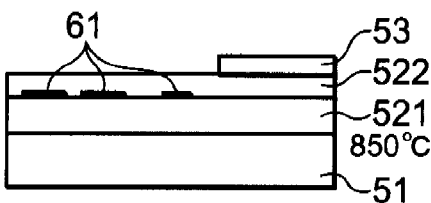
Figure 4E:
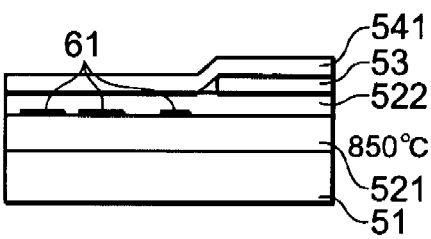
Figure 4F:
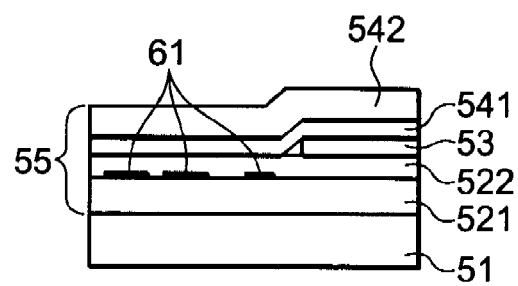
Figure 4G:
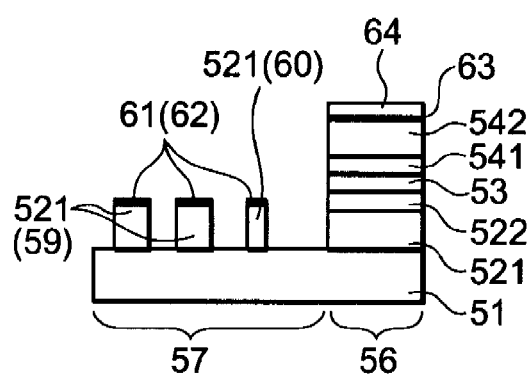
Figure 4H:
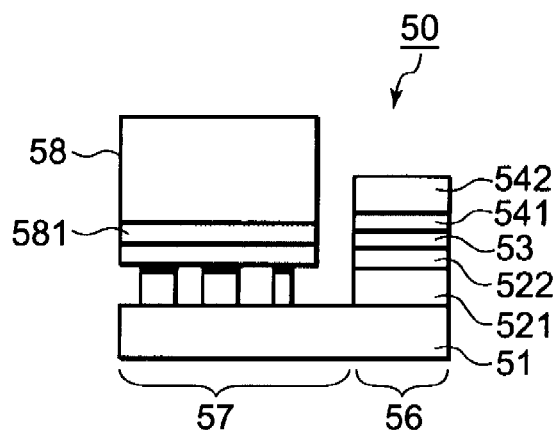

In FIG. 2(h), the end face of the core layer 13 is newly exposed by dry etching by using the chromium film 21 patterned in FIG. 2(g) as an etching mask. Also, the pedestal block 19 and the alignment marker 20 are formed. To achieve accurate etching, an etching rate of the chromium film 21 should desirably be $1/10$ or less of the etching rate of the upper cladding layer 142.

Thereafter, the chromium film is eliminated, and an insulating film, an electrode metal and the like are formed and patterned as required. In (h) for example, the chromium film 21 on the optical waveguide part 16 is eliminated.

According to exemplary embodiments of the present invention, the chromium film 21, which becomes the mask 22, is patterned after the high-temperature annealing process to form the pedestal block 19 and the alignment marker 20. And according to exemplary embodiments of the present invention, relative accuracy of the height of the core layer 13 and the light emitting device 18 is decided by the accuracy of the film thickness of the lower cladding layer 12 formed by the plasma CVD and the accuracy of the film thickness of the upper cladding layer 142 formed by the atmospheric pressure CVD. Because the accuracy of the film thickness of both of them are 1% or so, it is possible to keep variations at 2% or so at the maximum. Therefore, an active layer 181 of the light emitting device 18 and the core layer 13 are optically connected with extremely high accuracy. In FIG. 2, an example heat treatment temperature of each individual step is indicated.

By using the chromium film 21 as the mask 22, the verticality of an etching sidewall is improved. Also, the contact between the photoresist film and silicon dioxide film is improved via the chromium film. Further, it makes easier to recognize a marker by shielding infrared radiation. It is also possible to use a titanium film or the photoresist film instead of the chromium film 21.

While exemplary embodiments of the present invention have been described above, it is to be understood that numerous modifications to the exemplary embodiments of the invention will be apparent to those skilled in the art without departing from the spirit and scope of the present invention, as defined in the following claims and their legal equivalents.

What is claimed is:

1. An optical waveguide device, comprising:
    an optical waveguide part, comprising a base cladding layer; a core layer, and a covering cladding layer;
    wherein said base cladding layer is closer to a substrate than said covering cladding layer; and
    a photo device mounting part, comprising a pedestal block and an alignment marker on a part of said substrate from which said base cladding layer and said core layer are eliminated, wherein said pedestal block and said alignment marker are formed out of said covering cladding layer.

2. The optical waveguide device according to claim 1, wherein said covering cladding layer consists of one layer or more.

3. The optical waveguide device according to claim 2, wherein said pedestal block and said alignment marker are formed by the covering cladding layer, whose lower layer is eliminated.

4. The optical waveguide device according to claim 1, wherein a light shielding layer is formed on said pedestal block and said alignment marker.

5. A method of manufacturing an optical waveguide device comprising:
    forming a base cladding layer on a substrate;
    forming a core layer on said base cladding layer;
    exposing said substrate by eliminating said base cladding layer and said core layer in a photonic device mounting part;
    forming at least one layer of an optical waveguide part as a covering cladding layer which is farther from the substrate than said base cladding layer and of said photonic device mounting part as a pedestal block layer;
    forming a pedestal block and an alignment marker in said photonic device mounting part, and exposing an end face of said optical waveguide part by etching said pedestal block layer.

6. The method of manufacturing an optical waveguide device according to claim 5, further comprising improving the flatness of said covering cladding layer by heating after formation of said covering cladding layer.

7. The method of manufacturing an optical waveguide device according to claim 5, wherein the covering cladding layer consists of two layers or more,
    further comprising improving the flatness of the covering cladding layer by heating after formation of said covering cladding layer; and
    forming said pedestal block and said alignment marker by etching the covering cladding layer whose lower layer is eliminated.

8. The method of manufacturing an optical waveguide device according to claim 5, further comprising etching the end face of said optical waveguide part to retract the position of the end face farther away from the photonic device mounting part.

9. The method of manufacturing an optical waveguide device according to claim 5, wherein eliminating part of the way said base cladding layer in said photonic device mounting part is performed by reactive ion etching; and
    eliminating rest of said base cladding layer is performed by wet etching.

10. The method of manufacturing an optical waveguide device according to claim 5, comprising forming a light shielding layer on said covering cladding layer before etching said covering cladding layer.

* * * * *